(12) United States Patent
Zhu et al.

(10) Patent No.: US 11,780,004 B2
(45) Date of Patent: Oct. 10, 2023

(54) TROLLEY SEALING DEVICE FOR FLUE GAS CIRCULATION SYSTEM OF SINTERING MACHINE

(71) Applicant: Institute of Process Engineering, Chinese Academy of Sciences, Beijing (CN)

(72) Inventors: Tingyu Zhu, Beijing (CN); Wenqing Xu, Beijing (CN); Chaoqun Li, Beijing (CN); Yang Yang, Beijing (CN)

(73) Assignee: Institue of Process Engineering, Chinese Academy of Sciences

( * ) Notice: Subject to any disclaimer, the term of this patent is extended or adjusted under 35 U.S.C. 154(b) by 87 days.

(21) Appl. No.: 17/943,544

(22) Filed: Sep. 13, 2022

(65) Prior Publication Data

US 2023/0140052 A1     May 4, 2023

(30) Foreign Application Priority Data

Nov. 2, 2021   (CN) .......................... 202111286378.9

(51) Int. Cl.
*B29C 43/32*   (2006.01)
*B22F 3/00*    (2021.01)
*B22F 3/10*    (2006.01)
*B29C 37/00*   (2006.01)

(52) U.S. Cl.
CPC ............ *B22F 3/003* (2013.01); *B22F 3/1007* (2013.01); *B22F 2003/1042* (2013.01); *B22F 2201/50* (2013.01); *B29C 37/006* (2013.01)

(58) Field of Classification Search
CPC ...... F27B 21/00; F27D 17/001; F27D 17/002; F27D 17/008; B29C 37/006; B29C 43/006; B22F 3/00; B22F 3/003; B22F 3/10; B22F 3/1007; B22F 2003/1042; B22F 7/00

USPC .................................... 425/78, 405.1, 405.2
See application file for complete search history.

(56) References Cited

FOREIGN PATENT DOCUMENTS

| CN | 202372006 U | 8/2012 |
|---|---|---|
| CN | 202648404 U | 1/2013 |
| CN | 105066700 A | 11/2015 |
| CN | 208417523 U | 1/2019 |
| CN | 110030840 A | 7/2019 |

(Continued)

OTHER PUBLICATIONS

First Office Action issued in counterpart Chinese Patent Application No. 202111286378.9, dated Jan. 24, 2022.

*Primary Examiner* — Thu-Khanh T. Nguyen
(74) *Attorney, Agent, or Firm* — McDonald Hopkins LLC

(57) ABSTRACT

Disclosed is a trolley sealing device for a flue gas circulation system of a sintering machine, including a cover body covering a top surface of a sintering machine trolley. A top end of the cover body is provided with communication assemblies, and the communication assemblies communicate an inner cavity of the cover body with an outside environment; two ends of the inner cavity of the cover body are fixedly connected with vertical adjusting sections respectively, and a sealing device is arranged between the vertical adjusting sections and two ends of the top surface of the sintering machine trolley; and the cover body includes a plurality of frameworks; the plurality of frameworks are arranged above the sintering machine trolley, the communication assemblies are arranged on the frameworks, and skins are fixedly connected with the frameworks; and thermal insulation layers are arranged outside the skins.

8 Claims, 4 Drawing Sheets

(56) References Cited

FOREIGN PATENT DOCUMENTS

| CN | 209214385 U | * | 8/2019 |
| CN | 110514011 A | | 11/2019 |
| CN | 110608618 A | | 12/2019 |
| CN | 111578728 A | | 8/2020 |
| CN | 113218196 A | | 8/2021 |

* cited by examiner

US 11,780,004 B2

TROLLEY SEALING DEVICE FOR FLUE GAS CIRCULATION SYSTEM OF SINTERING MACHINE

CROSS-REFERENCE TO RELATED APPLICATIONS

This application claims priority to Chinese Patent Application No. 202111286378.9, filed on Nov. 2, 2021, the contents of which are hereby incorporated by reference.

TECHNICAL FIELD

The application belongs to the technical field of metallurgical industry, and in particular to a trolley sealing device for a flue gas circulation system of a sintering machine.

BACKGROUND

Sintering flue gas circulation technology is to extract flue gas from a windbox of a main flue of a sintering machine, and send the flue gas to a surface of a material bed of the sintering machine for circulating sintering after dedusting and through a circulating fan, so as to reduce an amount of flue gas in the sintering machine, improve a utilization rate of waste heat of sintering hot flue gas, reduce a fuel ratio and achieve an effect of energy saving and an emission reduction. It is an important condition for a stable operation of a flue gas circulation to ensure that the circulating flue gas is evenly distributed on the surface of the material bed and no flue gas leakage occurs. A flue gas circulating sealing device is an important structure for a recycling of the sintering flue gas. Ensuring a safe and stable operation of the system, increasing a convenience of a maintenance and reducing manufacturing and installation costs are important factors of the flue gas circulating sealing device.

CN105066700A discloses a sealed hot air cover device, which includes a flue gas cover installed at a circulating flue gas part used by a sintering machine to cover the sintering machine, a circulating air inlet pipe installed at a top of the flue gas cover and a stop valve installed on the circulating air inlet pipe; emergency vent holes are arranged on both sides of the flue gas cover, and electric valves are arranged on the emergency vent holes; a gap between front and rear end faces of the flue gas cover and a bed surface of a sintered material layer is sealed.

CN202648404U discloses a sealing device for circulating sintering flue gas, which includes a flue gas cover installed at a circulating flue gas part of a sintering machine, a plurality of circulating flue gas inlet pipes arranged at both sides of the flue gas cover, emergency ventilation pipes connected to the circulating flue gas inlet pipes, and cut-off valves installed on the two pipes; gaps between front and rear end faces of the flue gas cover and a material surface of the sintering machine are respectively provided with sealing brush bars, sealing brush bar adjusting devices are fixed on sealing brush bar bases, and the adjusting devices are connected with the flue gas cover through bolts; the gaps between the two sides of the flue gas cover and the sintering machine trolley are respectively provided with the sealing brush bars and labyrinth mechanical sealing structures; an upper sealing plate is fixed on the sintering machine trolley, a lower sealing plate is fixed on the flue gas cover, the upper sealing plate and the lower sealing plate are labyrinth-matched and sealed, and the sealing brush bar bases are inserted into a trapezoidal groove on one side of the lower sealing plate close to the sintering machine trolley.

CN208417523U discloses a multi-layer linkage type side sealing device for gas injection sintering, which includes a sintering machine trolley, a sealing cover, a gas injection device and a side sealing device. The sintering machine trolley is located in the sealing cover. The gas injection device is located above the sintering machine trolley. The device is provided with a multi-layer side sealing device. The multi-layer side sealing device is arranged between two sides of the sintering machine trolley and an inner side of the sealing cover. The side sealing device includes a connecting rod, a rotating shaft, a bearing plate and a sealing plate. One end of the connecting rod is connected with the inner side of the sealing cover. The other end of the connecting rod is provided with the rotating shaft. The bearing plate is connected with the rotating shaft. The sealing plate is connected with the bearing plate. The end of the sealing plate is close to an outer side of the sintering machine trolley.

According to an investigation of existing patents, most of the existing sealing covers are semicircular or arc structures with the surface of the sintering machine trolley as a reference height. The sealing cover body and the sealing cover are supported independently, and the sealing cover and the trolley are sealed by hard seal or high-temperature resistant rubber. However, main defects of this design are: an overall height of the sealing cover with a semicircular sealing structure is too high, thus leading to a limited operating space of a top crane and other equipment, and increasing a manufacturing cost and a disassembly difficulty due to an overall bulkiness; an arc design of the sealing cover makes a horizontal tension of the sealing cover too large, so the difficulty of structural strengthening is increased and an overall weight is increased. The sealing cover and a support are designed separately, and an air inlet and an air supply port are connected with the sealing cover independently, thus increasing a stress strength of the sealing cover, and increasing the structure and the cost of the sealing cover. Therefore, it is necessary to design a new sealing device to solve problems of a complex structure, an excessive cost and a serious space occupation of the existing sealing cover.

SUMMARY

An objective of the application is to provide a trolley sealing device for a flue gas circulation system of a sintering machine, so as to solve problems existing in the prior art.

In order to achieve the above objective, the application provides a following scheme: the application provides a trolley sealing device for a flue gas circulation system of a sintering machine, including a cover body covering a top surface of a sintering machine trolley; a top end of the cover body is provided with communication assemblies, and the communication assemblies communicate an inner cavity of the cover body with an outside environment;

two ends of the inner cavity of the cover body are fixedly connected with vertical adjusting sections respectively, and a sealing device is arranged between the vertical adjusting sections and two ends of the top surface of the sintering machine trolley; and the cover body includes a plurality of frameworks; the plurality of frameworks are arranged above the sintering machine trolley, the communication assemblies are arranged on the frameworks, and skins are fixedly connected with the frameworks; and thermal insulation layers are arranged outside the skins.

Optionally, each communication assembly includes symmetrically arranged air inlets, and the air inlets are arranged on each framework; each air supply port is arranged between the two air inlets, and each air supply port is arranged on each framework; and the air inlets and the air supply ports are communicated with the inner cavity of the cover body and the outside environment.

Optionally, the cover body includes a plurality of first modules and a plurality of second modules, and the first modules and the second modules are surrounded by the frameworks and the skins; the air inlets and the air supply ports are arranged on top surfaces of the first modules; and the plurality of second modules are arranged between two adjacent first modules.

Optionally, a top end of the sealing device is fixedly connected with the vertical adjusting sections through bolts, and a bottom end of the sealing device is overlapped with the top surface of the sintering machine trolley; and the cover body, the sealing device and the sintering machine trolley enclose a closed cavity.

Optionally, the sealing device is external, and the sealing device is a waste belt.

Optionally, each framework has a semicircular arch structure, and the several frameworks are arranged in parallel at equal intervals along an extension direction of the sintering machine; and both ends of each framework are fixedly connected with a ground support by the bolts.

Optionally, a span of each framework is 1.2-2 times of a width of the sintering machine trolley; an arch height of each framework is 2-6 times that of the sintering machine trolley.

Optionally, the skins are covered on the frameworks above the top surface of the sintering machine trolley, and the skins are not provided on the frameworks below the top surface of the sintering machine trolley.

Optionally, a bottom end of each vertical adjusting section is provided with a plurality of adjusting blocks, and the adjusting blocks are used for adjusting an installation height H of the cover body; and the installation height H is 0.7-0.9 times the height of the cover body.

The application discloses following technical effects: the application discloses the trolley sealing device for the flue gas circulation system of a sintering machine, the cover body made of the frameworks and the skins are directly covered on the sintering machine trolley, and the cover body and the sintering machine trolley are sealingly connected by the sealing device to form a flue gas channel; the top end of the cover body is provided with the communication assemblies for flowing in flue gas and adjusting an oxygen content in the flue gas channel to ensure that an oxygen content in the flue gas channel meets combustion requirements, and meanwhile, a negative pressure environment in the flue gas channel is adjusted to ensure a smooth inflow of the flue gas; the cover body integrates sealing parts and supporting parts into a whole, thus reducing a cost of the support; the semicircular arch frameworks run through whole equipment, and an internal bending moment of each arch body is almost zero and only bears an axial force, so section steels adopted by the frameworks have low specification requirements, reduce a weight of the support, and have a good economy; the sealing part above a trolley surface is covered with the skins, while a lower part is only supported by the section steel frameworks; and the frameworks with semicircular arch structures have a large bearing capacity, so there is no need to additionally set an internal support of the cover body, a space under the cover body is increased and a disassembly and a maintenance of components in the cover are facilitated. Air inlets and air supply ports are all arranged on the supporting frameworks, and the skins are not affected by external forces and only serve as a barrier for blocking high-temperature flue gas, so that thicknesses and weights of steel plates of the skins are reduced. The vertical adjusting sections are arranged in the cover body, and adjust a height of the cover body according to smooth simulation data of the flue gas in the cover body, so that a uniform distribution of the flue gas in the cover body is realized, the overall height of the cover body is reduced, and an operation of a crane above the cover body is facilitated; a sealing rubber strip in a sealing assembly adopts a waste belt of a sintering plant that transports high-temperature materials; the belt has a high wear resistance, a high temperature resistance, a long service life and a low cost. The sealing rubber strip of the sealing assembly is externally installed on the fixed steel plates of the cover body, and may be replaced online after being damaged during a use, thus improving a reliability of the device. The sealing device is designed as a split movable structure of the cover body; a main body of the cover body is composed of a plurality of modules that are flexibly disassembled and fixed by bolts, insulated and lapped for sealing, so that an installation and the disassembly are more convenient. The application has advantages of a simple structure, a strong firmness, the convenient installation and disassembly, a small space proportion, a high modularity, a high convenience for the maintenance of the sintering machine trolley, less material for the cover body, the low cost and a high popularization value.

BRIEF DESCRIPTION OF THE DRAWINGS

In order to more clearly explain embodiments of the application or technical solutions in the prior art, the following briefly introduces drawings that need to be used in the embodiments. Obviously, the drawings in the following description are only some embodiments of the application. For those of ordinary skill in the art, other drawings may be obtained according to these drawings without any creative effort.

DETAILED DESCRIPTION OF THE EMBODIMENTS

Technical solutions in embodiments of the application are clearly and completely described below with reference to drawings in the embodiments of the application. Obviously, the described embodiments are only part of the embodiments of the application, but not all of them. Based on the embodiments of the application, all other embodiments obtained by ordinary technicians in the field without creative labor are within a scope of the application.

In order to make the above objects, features and advantages of the application more obvious and understandable, the application is explained in further detail below with reference to the drawings and detailed description.

Figure 1:
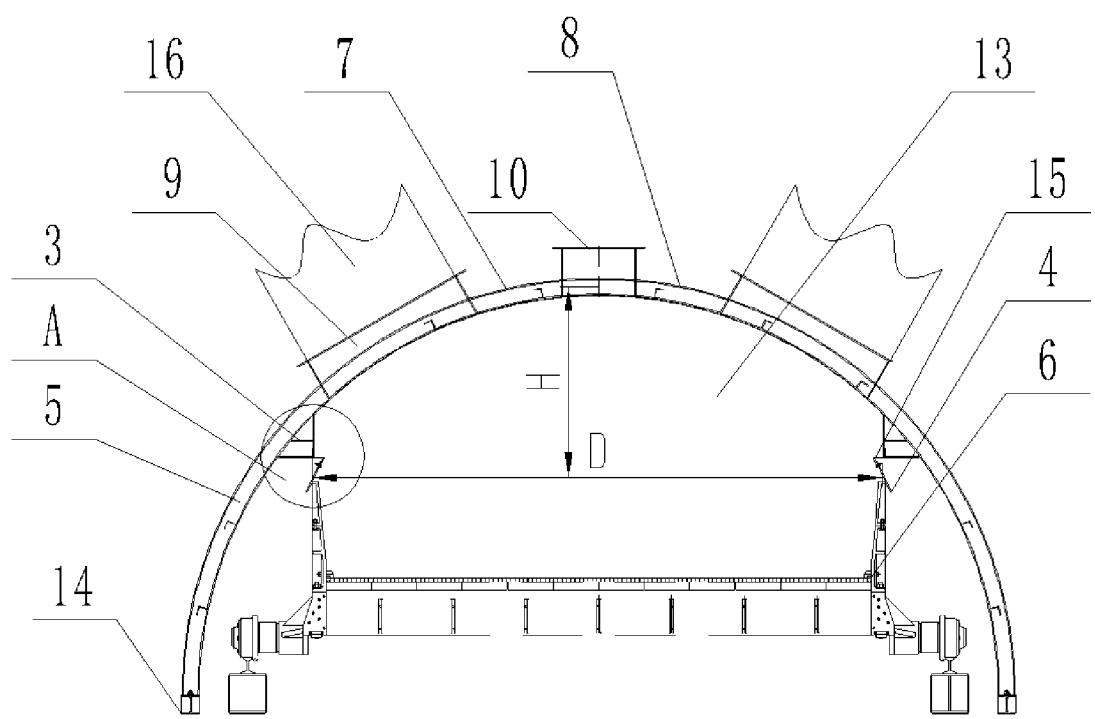
FIG. 1 is a schematic structural diagram of a trolley sealing device for a flue gas circulation system of a sintering machine according to the application.
Figure 2:
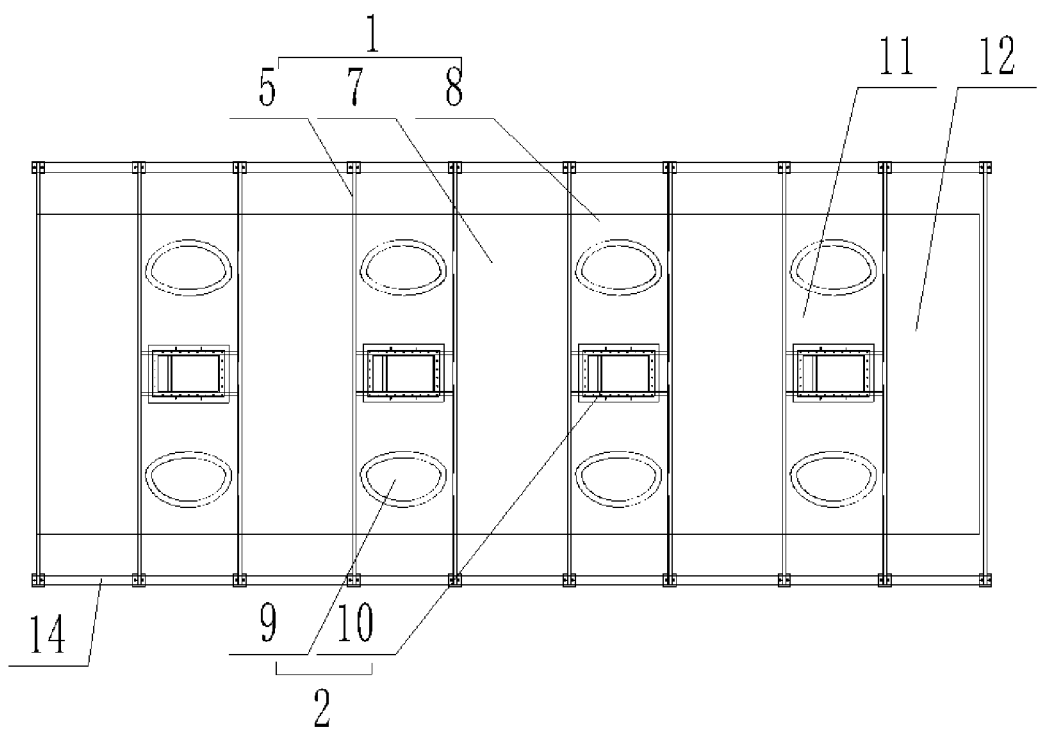
FIG. 2 is a plan view of a schematic structural diagram of a trolley sealing device for a flue gas circulation system of a sintering machine according to the application.
Figure 3:
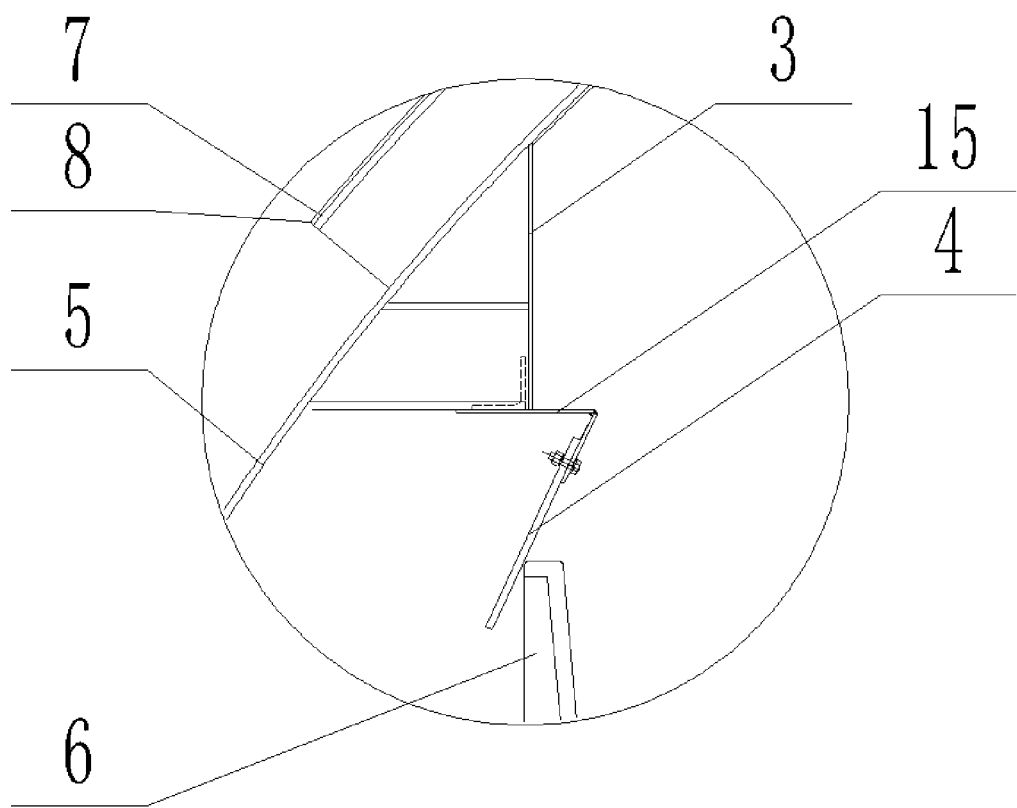
FIG. 3 is a partial enlarged view of A in FIG. 1.
Figure 4:
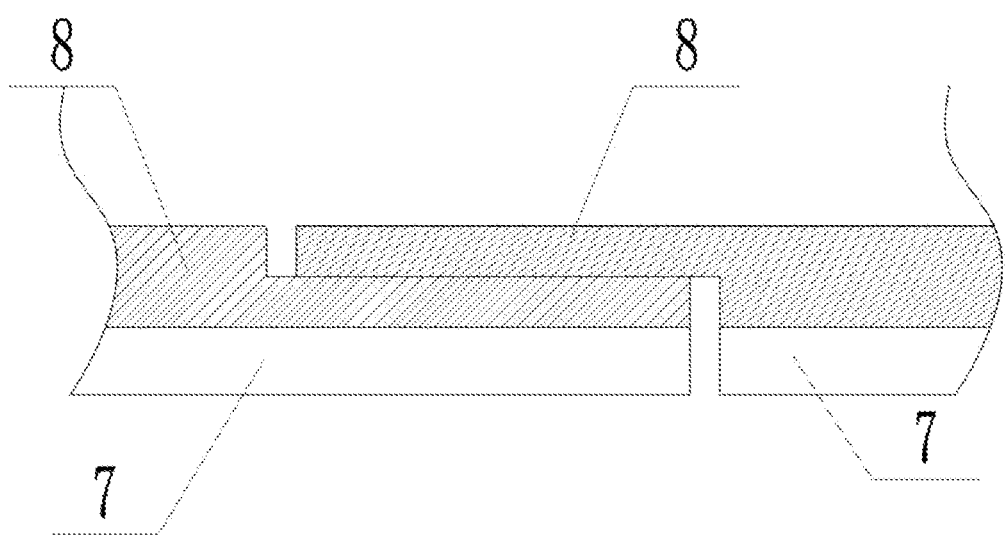
FIG. 4 is a schematic installation diagram of adjacent modules of the application.

With reference to FIGS. 1-4, the application provides a trolley sealing device for a flue gas circulation system of a sintering machine, including a cover body 1 covering a top surface of a sintering machine trolley 6; a top end of the cover body 1 is provided with communication assemblies 2, and the communication assemblies 2 communicate an inner cavity of the cover body 1 with an outside environment;

two ends of the inner cavity of the cover body 1 are fixedly connected with vertical adjusting sections 3 respectively, and a sealing device 4 is arranged between the vertical adjusting sections 3 and two ends of the top surface of the sintering machine trolley 6; and the cover body 1 includes a plurality of frameworks 5; the plurality of frameworks 5 are arranged above the sintering machine trolley 6, the communication assemblies 2 are arranged on the frameworks 5, and skins 7 are fixedly connected with the frameworks 5; thermal insulation layers 8 are arranged outside the skins 7.

According to the application, the cover body 1 made of the frameworks 5 and the skins 7 are directly covered on the sintering machine trolley 6, and the cover body 1 and the sintering machine trolley 6 are sealingly connected by the sealing device 4 to form a flue gas channel; the top end of the cover body 1 is provided with the communication assemblies for flowing in flue gas and adjusting an oxygen content in the flue gas channel to ensure that an oxygen content in the flue gas channel meets combustion requirements, and meanwhile, a negative pressure environment in the flue gas channel is adjusted to ensure a smooth inflow of the flue gas; the cover body 1 integrates sealing parts and supporting parts into a whole, thus reducing a cost of the support; the semicircular arch frameworks 5 run through whole equipment, and an internal bending moment of each arch body is almost zero and only bears an axial force, so section steels adopted by the frameworks 5 have low specification requirements, reduce a weight of the support, and have a good economy; the sealing part above a trolley surface is covered with the skins 7, while a lower part is only supported by the section steel frameworks 5; and the frameworks 5 with semicircular arch structures have a large bearing capacity, so there is no need to additionally set an internal support of the cover body 1, a space under the cover body 1 is increased and a disassembly and a maintenance of components in the cover are facilitated. Air inlets and air supply ports are all arranged on the supporting frameworks 5, and the skins 7 are not affected by external forces and only serve as a barrier for blocking high-temperature flue gas, so that thicknesses and weights of steel plates of the skins 7 are reduced. The vertical adjusting sections 3 are arranged in the cover body 1, and adjust a height of the cover body 1 according to smooth simulation data of the flue gas in the cover body 1, so that a uniform distribution of the flue gas in the cover body 1 is realized, the overall height of the cover body 1 is reduced, and an operation of a crane above the cover body 1 is facilitated; a sealing rubber strip in a sealing assembly adopts a waste belt of a sintering plant that transports high-temperature materials; the belt has a high wear resistance, a high temperature resistance, a long service life and a low cost. The sealing rubber strip of the sealing assembly is externally installed on the fixed steel plates of the cover body 1, and may be replaced online after being damaged during a use, thus improving a reliability of the device. The sealing device 4 is designed as a split movable structure of the cover body 1; a main body of the cover body 1 is composed of a plurality of modules that are flexibly disassembled and fixed by bolts, insulated and lapped for sealing, so that an installation and the disassembly are more convenient.

In an embodiment, the skins 7 are not affected by the external forces, but only serve as the barrier for blocking high-temperature flue gas, so that the thicknesses and the weights of the steel plates are reduced, and at the same time, an influence of the cover body 1 on a ground support 14 may be reduced.

In an embodiment, the thermal insulation layers 8 on the cover body 1 include, but are not limited to, external thermal insulation materials and internal spraying thermal insulation coatings.

In an embodiment, each communication assembly 2 includes the symmetrically arranged air inlets 9, and the air inlets 9 are arranged on each framework 5; each air supply port 10 is arranged between the two air inlets 9, and each air supply port 10 is arranged on each framework 5; and the air inlets 9 and the air supply ports 10 are communicated with the inner cavity of the cover body 1 and the outside environment. The two air inlets 9 are respectively connected with external air inlet pipes 16, and valves are set to control opening states of the air inlets 9, so that an appropriate amount of the flue gas is introduced according to an actual state in the cover body 1; the air supply ports 10 are used for introducing outside air into the cover body 1, adjusting the oxygen content of the flue gas in the cover body 1, ensuring that the oxygen content of flue gas in the cover body 1 is sufficient to meet the combustion requirements; meanwhile, a negative pressure state in the cover body 1 may be adjusted to ensure that the outside flue gas smoothly enters the cover body 1.

In an embodiment, the cover body 1 includes a plurality of first modules 11 and a plurality of second modules 12, and the first modules 11 and the second modules 12 are surrounded by the frameworks 5 and the skins 7; the air inlets 9 and the air supply ports 10 are arranged on top surfaces of the first modules 11; and the plurality of second modules 12 are arranged between two adjacent first modules 11. The first modules 11 and the second modules 12 are same in shapes, sizes, the materials and structures except that the first modules 11 are provided with the air inlets 9 and the air supply ports 10, and the second modules 12 are not provided. During the installation, the first modules 11 and the second modules 12 may be fixed side by side as required. The first modules 11 and the second modules 12 may be manufactured off-site according to actual requirements, and then sent to infield for the assembly, so an installation efficiency of the cover body 1 is improved and a later replacement and a later maintenance are facilitated.

In an embodiment, a number of the second modules 12 is determined according to an actual intake demand of the flue gas; the larger the flue gas demand, the smaller the number of the second modules 12; a least, the first modules 11 may be directly fixed side by side to form the required cover body 1 without installing the second modules 12. Adjacent modules are overlapped to improve a tightness of the cover body 1.

In an embodiment, a top end of the sealing device 4 is fixedly connected with the vertical adjusting sections 3 through the bolts, and the bottom end of the sealing device 4 is overlapped with the top surface of the sintering machine trolley 6; the cover body 1, the sealing device 4 and the sintering machine trolley 6 enclose a closed cavity 13; the sealing device 4 is external, and the sealing device 4 is the waste belt. The cover body 1, the sealing device 4 and the sintering machine trolley 6 enclose the closed cavity 13, and the flue gas enters the closed cavity 13 from the air inlets and then flows in the closed cavity 13 until the flue gas is used; the sealing device 4 is lapped at a top end of a sintering machine rack, so the flue gas rushed into the closed cavity 13 is prevented from escaping from a gap of the sealing device 4; the belt has the higher wear resistance and the high temperature resistance, the long service life and the low cost; the sealing device 4 is externally installed at bottom ends of the vertical adjusting sections 3 of the cover body 1, and may be replaced online after being damaged during the use, thus improving the reliability of the device.

In an embodiment, each framework 5 has the semicircular arch structure, and the several frameworks 5 are arranged in parallel at equal intervals along an extension direction of the sintering machine; and both ends of each framework 5 are fixedly connected with the ground support 14 by the bolts. The frameworks 5 are supported at a top end of the ground support 14; compared with a conventional sealing cover structure, a horizontal thrust generated by this structure is zero, and no horizontal thrust is generated for the ground support 14, so the structure is more reasonable and reliable; the internal bending moment of the each arch body is almost zero with the semicircular arch structure, and only an axial force is born; therefore, compared with the conventional structure, the specification of the section steel adopted by each framework 5 is greatly reduced, and the section steel has a very small weight and an obvious economic rationality. The structure of each semicircular arch framework 5 omits a sealing cover support in the conventional structure, saves an engineering quantity and shortens a construction period. Meanwhile, the overall height of the sealing cover is reduced; because of a reduction of the overall height, the installation and the disassembly of the cover body 1 is more convenient, and a maintenance convenience of the sintering machine trolley 6 is improved. Compared with a square flat roof structure, the arch structure has a higher support strength, and each arch framework 5 forms a high-strength support structure, so there is no need to additionally arrange the support below each framework 5 to support a arch vault, and the materials are saved and benefits are improved; at the same time, under a condition of a single outer length, one arch has a larger area, thus increasing a circulation space of the flue gas.

In an embodiment, each framework 5 is supported by a bending of the section steel, so the manufacture is facilitated and there is no need for welding.

In an embodiment, a span of each framework 5 is 1.2-2 times of a width of the sintering machine trolley 6; an arch height of each framework 5 is 2-6 times that of the sintering machine trolley 6. After the semicircular arch of each framework 5 is installed on the sintering machine rack, the semicircular arch may also cover a roof of the sintering machine rack, so the installation height of the cover body 1 is reduced and the space is greatly saved. The best span of each framework 5 is 1.5 times the width of sintering machine trolley 6; the arch height of each framework 5 is optimally twice that of the sintering machine trolley 6; the lower the height of each framework 5, the less materials are used in the cover body 1, and the larger an outer upper space of the cover body 1 is, which is more conducive to the operation of the crane above the sintering machine trolley 6.

In an embodiment, the skins 7 are covered on the frameworks 5 above the top surface of the sintering machine trolley 6, and the skins 7 are not provided on the frameworks 5 below the top surface of the sintering machine trolley 6. Each framework 5 of the semicircular arch structure has a large bearing capacity and a large supporting span, so there is a large maintenance space for a trolley tailgate, a track, track wheels, bearings and other components; and the lower end is not provided with the skins 7, so the disassembly and the maintenance of the components are facilitated.

In an embodiment, the bottom end of each vertical adjusting section 3 is provided with a plurality of adjusting blocks 15, and the adjusting blocks 15 are used for adjusting the installation height H of the cover body 1; and the installation height H is 0.7-0.9 times the height of the cover body 1. The adjusting blocks 15 at the bottom end of each vertical adjusting section 3 adjust the height of the sealing cover according to the data of the flue gas flow simulation in the sealing cover, so as to realize the uniform distribution of the flue gas in the sealing cover. The installation height H is preferably 0.75 times of the height of the cover body 1. At this time, a flow field distribution in the cover body 1 is the most uniform, and results of a flow field simulation support this part of data.

During usage, each semicircular arch framework 5 is bent according to design requirements of the section steel, the air inlets 9 and the air supply ports 10 are enclosed with the section steel, and then the vertical adjusting sections 3 are welded and installed at appropriate positions inside each framework 5, and the vertical adjusting sections 3 on both sides are symmetrical. Finally, the skin 7 and the thermal insulation layer 8 are fixed on two parallel adjacent frameworks 5 to complete a manufacture of each first module 11 of the cover body 1. The shape and the size of each second module 12 are the same as those of each first module 11, except that the air inlets 9 and the air supply ports 10 are not required.

The waste belt with a proper size is selected as the sealing device 4; one end of the sealing device 4 is fixed at the bottom ends of the vertical adjusting sections 3, and then the first modules 11 are covered at the top end of the sintering machine rack, the bottom ends of the first modules 11 are fixedly connected with the ground support 14, and finally the sealing device 4 is overlapped at both sides of the top end of the sintering machine rack; the first modules 11 and the second modules 12 are installed in sequence according to actual needs, and the adjacent modules are fixedly connected with each other, finally forming the complete cover body 1.

The air inlet pipes are fixedly connected with the air inlets 9, and the valves are provided, and other valves are provided at the first modules 11. The air inlet pipes are used for introducing flue gas into the cover body 1, and the first modules 11 are used for adjusting the oxygen content and negative pressure state of flue gas in the cover body 1. The valves may be manual valves or electric valves.

The application has advantages of a simple structure, a strong firmness, the convenient installation and disassembly, a small space proportion, a high modularity, a high convenience for the maintenance of the sintering machine trolley 6, little material for the cover body 1, the low cost and a high popularization value.

In the description of the application, it should be understood that an orientation or positional relationship indicated by terms "longitudinal", "lateral", "up", "down", "front", "back", "left", "right", "vertical", "horizontal", "top", "bottom", "inner", "outer" and so on are based on the orientation or positional relationship shown in the drawings, only for a convenience of describing the application, rather than indicating or implying that the device or element referred to must have a specific orientation, be configured and operate in a specific orientation, and therefore cannot be understood as limiting the application.

The above embodiments only describe preferred modes of the application, but do not limit the scope of the application. On a premise of not departing from a design spirit of the application, all kinds of modifications and improvements made by ordinary technicians in the field to the technical scheme of the application shall fall within the scope of protection determined by claims of the application.

What is claimed is:

1. A trolley sealing device for a flue gas circulation system of a sintering machine, comprising a cover body covering a top surface of a sintering machine trolley; wherein a top end of the cover body is provided with communication assemblies, and the communication assemblies communicate an inner cavity of the cover body with an outside environment;
   two ends of the inner cavity of the cover body are fixedly connected with vertical adjusting sections respectively, and a sealing device is arranged between the vertical adjusting sections and two ends of the top surface of the sintering machine trolley;
   the cover body comprises a plurality of frameworks; the plurality of frameworks are arranged above the sintering machine trolley, the communication assemblies are arranged on the frameworks, and skins are fixedly connected with the frameworks; and thermal insulation layers are arranged outside the skins;
   a top end of the sealing device is fixedly connected with the vertical adjusting sections through bolts, and a bottom end of the sealing device is overlapped with the top surface of the sintering machine trolley; and the cover body, the sealing device and the sintering machine trolley enclose a closed cavity; and
   a bottom end of each vertical adjusting section is provided with a plurality of adjusting blocks, the plurality of adjusting blocks are used for adjusting an installation height of the cover body according to data of a flue gas flow simulation in the sealing cover.

2. The trolley sealing device for the flue gas circulation system of the sintering machine according to claim 1, wherein each communication assembly comprises symmetrically arranged air inlets, and the air inlets are arranged on each framework; each air supply port is arranged between the two air inlets, and each air supply port is arranged on each framework; and the air inlets and the air supply ports are communicated with the inner cavity of the cover body and the outside environment.

3. The trolley sealing device for the flue gas circulation system of the sintering machine according to claim 2, wherein the cover body comprises a plurality of first modules and a plurality of second modules, and the first modules and the second modules are surrounded by the frameworks and the skins; the air inlets and the air supply ports are arranged on top surfaces of the first modules; and the plurality of second modules are arranged between two adjacent first modules.

4. The trolley sealing device for the flue gas circulation system of the sintering machine according to claim 1, wherein each framework has a semicircular arch structure, and the several frameworks are arranged in parallel at equal intervals along an extension direction of the sintering machine; and both ends of each framework are fixedly connected with a ground support by the bolts.

5. The trolley sealing device for the flue gas circulation system of the sintering machine according to claim 4, wherein a span of each framework is 1.2-2 times of a width of the sintering machine trolley; an arch height of each framework is 2-6 times that of the sintering machine trolley.

6. The trolley sealing device for the flue gas circulation system of the sintering machine according to claim 1, wherein the skins are covered on the frameworks above the top surface of the sintering machine trolley, and the skins are not provided on the frameworks below the top surface of the sintering machine trolley.

7. The trolley sealing device for the flue gas circulation system of the sintering machine according to claim 1, the installation height is 0.7-0.9 time a height of the cover body.

8. The trolley sealing device for the flue gas circulation system of the sintering machine according to claim 1, wherein the sealing device is external, and the sealing device is a waste belt.

* * * * *